United States Patent Office 3,303,949
Patented Feb. 14, 1967

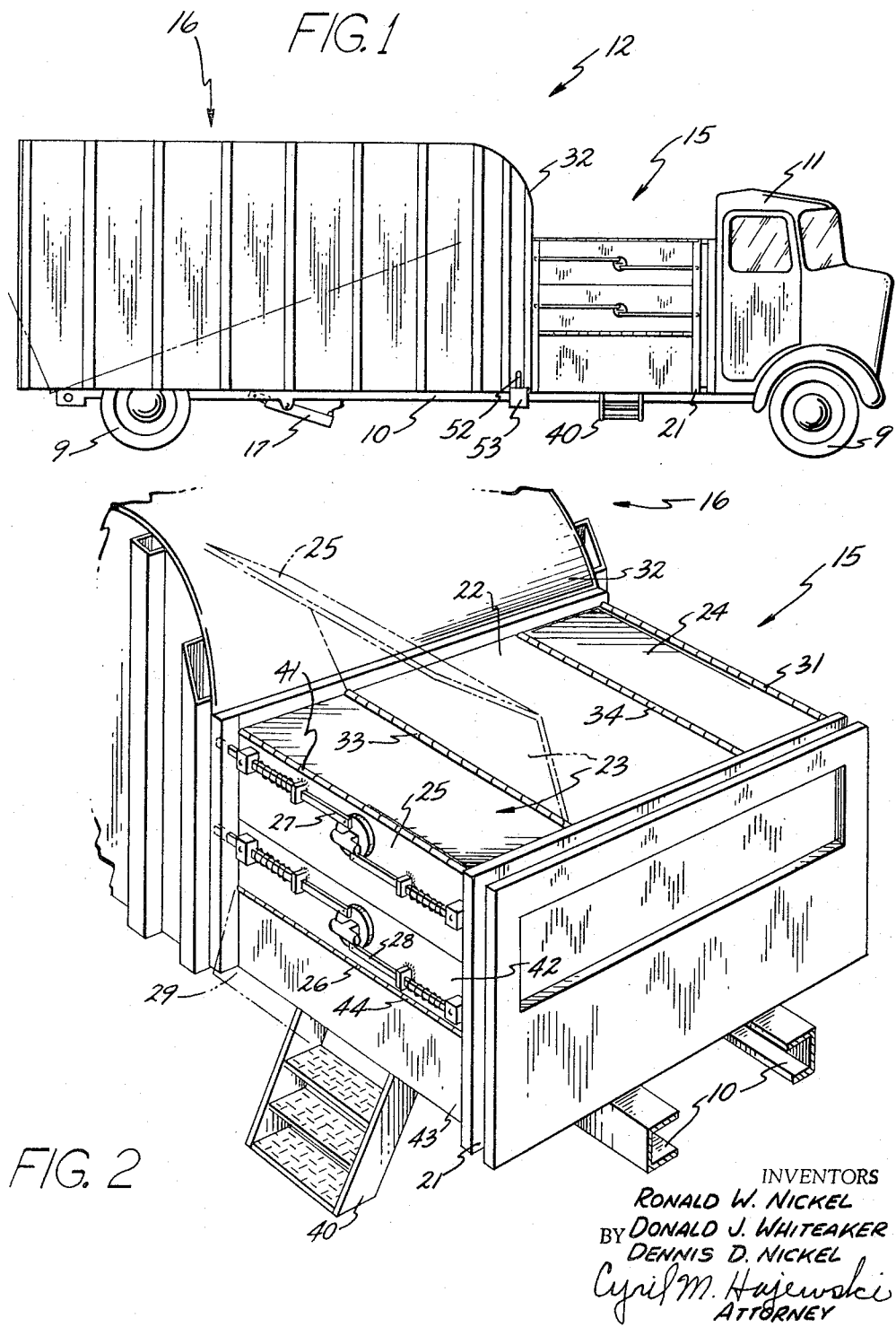

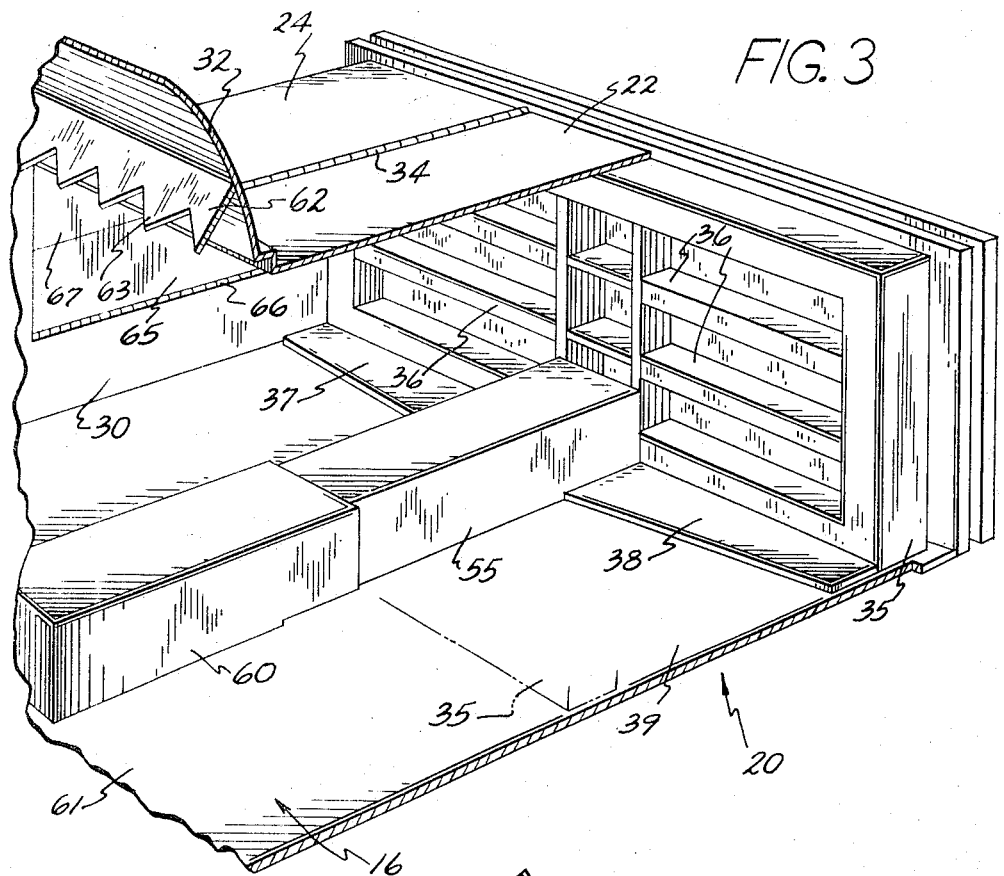
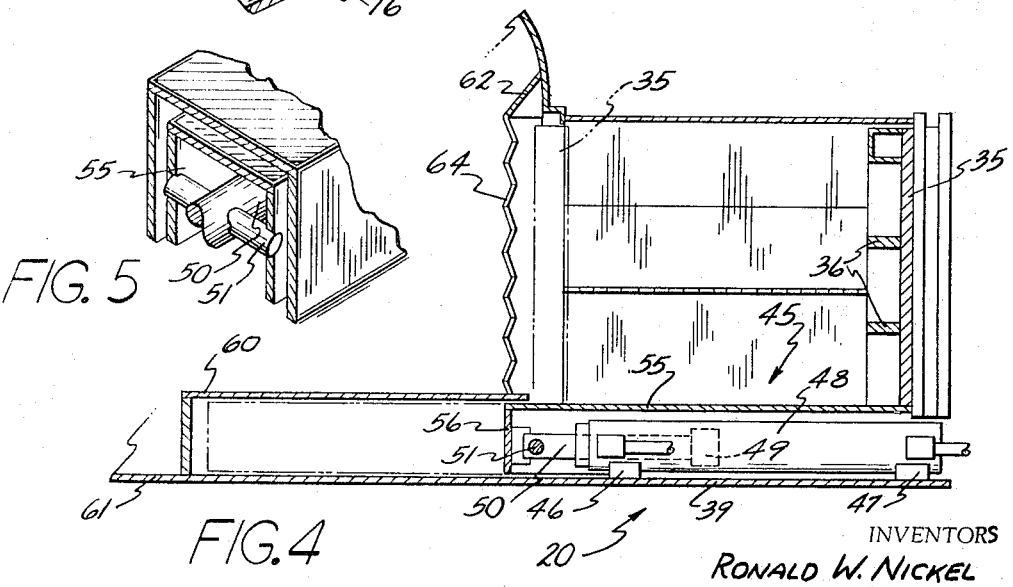

3,303,949
REFUSE TRUCK
Ronald W. Nickel, 131 N. Locust St., Oconomowoc, Wis. 53066; Donald J. Whiteaker, 2860 Interlaken Drive, Oconomowoc, Wis. 53066; and Dennis D. Nickel, Wood St., Delafield, Wis. 53018
Filed Dec. 23, 1964, Ser. No. 420,744
2 Claims. (Cl. 214—83.3)

This invention relates generally to trucks for transporting refuse and more particularly to refuse trucks that are adapted to be loaded from the side, commonly referred to as "side loaders."

Side loading refuse trucks are usually provided with a loading compartment formed in the body of the truck for receiving the refuse that is to be loaded into the storage compartment which is formed in the truck body adjacent to the loading compartment. A compacting mechanism is included for transferring the refuse from the loading compartment into the storage compartment and for compacting the refuse in the storage compartment to increase the capacity of the truck. Access to the loading compartment is from the sides of the truck. After the operator places the refuse in the loading compartment through the side access, the compacting mechanism is actuated to transfer the refuse from the loading compartment into the storage compartment. As the latter fills, the refuse is compacted by the action of the compacting mechanism.

One of the disadvantages of side loading refuse trucks lies in the fact that the power actuator for operating the compacting mechanism is normally disposed beneath the floor of the body which renders it necessary to raise the floor an appreciable height above the truck axles to furnish the necessary clearance for the power actuator. As a result, the operator must lift the refuse a substantial height above the ground in order to dump it into the loading department and the labor involved is fatiguing.

It is therefore a general object of the present invention to provide an improved side loading refuse truck.

Another object of the invention is to provide a side loading refuse truck in which the floor of the truck body is depressed to facilitate loading.

Another object is to provide a side loading refuse truck with a compacting mechanism that includes a power actuator disposed within the body of the truck.

Another object is to provide an improved structure for protecting the power actuator that operates the compacting mechanism of a refuse truck when the power actuator is located within the compartment of the truck that receives the refuse.

A further object is to provide an improved side loading refuse truck of simple and inexpensive but sturdy construction which is extremely efficient in operation.

According to this invention, the improved refuse truck comprises a chassis carrying a cab and a truck body. The body is divided into a storage compartment formed at the rear portion of body and a loading compartment in front of the storage compartment. Access to the loading compartment is had from both sides of the truck and the operator loads the refuse into the loading compartment. A power actuated compacting mechanism is then operated to move the refuse from the loading compartment into the storage compartment, and as the latter fills, the compacting mechanism functions to compact the refuse within the storage compartment to substantially increase its capacity.

The power actuator for operating the compacting mechanism comprises a piston and cylinder mechanism mounted on top of the floor of the truck body. The cylinder is fixed to the top of the floor in the loading compartment and has its forward end rigidly secured to the forward wall of the loading compartment. The piston and cylinder mechanism operates a compression plate in a rectilinear movement within the loading department, toward and away from the storage compartment, for moving the refuse from the loading compartment into the storage compartment and compacting it therein.

The piston and cylinder mechanism is protected within the truck body by an elongated telescoping housing that includes a fixed section mounted within the storage compartment and a slidable section that is adapted to telescope within the fixed section. The rear end of the slidable housing section is connected to the piston rod of the piston and cylinder mechanism while the forward end of the slidable section is rigidly secured to the compression plate so that the power for actuating said compression plate is transmitted through the slidable housing section from the piston and cylinder mechanism. As the piston and cylinder mechanism is energized to extend the piston rod outwardly of the cylinder, the slidable housing section is telescoped into the fixed section and the compression plate moves with it within the loading compartment to shift the refuse out of the loading compartment and into the storage compartment. With this arrangement the piston and cylinder mechanism is well protected at all times by the telescoping housing despite its location within the truck body where the refuse is received.

The foregoing and other objects of this invention which will become more fully apparent from the following detailed description of an embodiment thereof may be achieved by the apparatus herein described by way of example in connection with the illustration of its structural components in the accompanying drawings, in which:

FIGURE 1 is a side elevational view of a refuse truck incorporating the features of the present invention;

FIGURE 2 is a detail perspective view illustrating the exterior of the loading compartment of the refuse truck depicted in FIGURE 1;

FIGURE 3 is a detail perspective view illustrating the interior of the loading compartment shown in FIGURE 2;

FIGURE 4 is a view in vertical section taken longitudinally through the loading compartment and a portion of the storage compartment of the refuse truck shown in FIGURE 1 to illustrate the components of the compacting mechanism for compacting the refuse into the storage compartment of the truck; and FIGURE 5 is a fragmentary detail prespective view showing the attachment of the piston rod to the slidable housing of the compacting mechanism.

Reference is now made more particularly to the drawings and specifically to FIGURE 1 thereof which illustrates a side loading refuse truck incorporating the features of the present invention. The illustrated truck comprises a chassis 10 supported by wheels 9 to render it mobile. The chassis 10 carries a cab 11 at its forward end with a body 12 being mounted on the chassis 10 behind the cab 11. The cab 11 includes the motor as well as a compartment for a driver and passenger in the conventional manner. The body 12 is divided into a loading compartment 15 and a storage compartment 16. The body 12 is pivotably supported by the chassis 10 so that it may be pivoted from the horizontal position indicated by the solid lines in FIG. 1 to an inclined position represented by the broken lines in FIGURE 1 for discharging the contents of the storage compartment 16. A hydraulic piston and cylinder mechanism 17 is mounted underneath the body 12 and is connected to actuate the body 12 in its pivotal movement between its inclined position for unloading and its normal horizontal position.

The refuse that is to be transported by the truck is loaded from the side of the truck into the loading compartment 15 and after a quantity of refuse has been placed into the loading compartment 15, a compacting mechanism generally identified by the reference numeral 20 in FIGS. 3 and 4 is operated to move the refuse out of the loading compartment 15 and into the storage compartment 16. As the latter becomes filled with refuse, the compacting mechanism 20 functions to compress the refuse therein for increasing its capacity.

The forward end of the storage compartment 15 is closed by a plate 21 and a top plate 22 is centrally located along a central portion of the top of the storage compartment 15 and extends rearwardly from the front plate 21 to a front wall 32 of the storage compartment 16. Access to the storage compartment 15 is made available from both sides of the truck and to this end, one side of the top plate 22 is connected by a hinge 33 to a top door plate 23 while the opposite side of the plate 22 is coupled to a top door plate 24 by a hinge 34. The hinges 33 and 34 render the top door plates 23 and 24 respectively, pivotable relative to the centrally fixed top plate 22. In addition to its hinged connection to the top plate 22, the opposite side of the top door plate 23 is connected by a hinge 41 to a side door panel 25 that depends from the top door plate 23 to close the upper portion of the side of the loading compartment 15. With this arrangement, the door panel 25 and the top door plate 23 can be swung upwardly, as indicated by the broken lines in FIGURE 2, to overlie each other and rest upon the central top plate 22 for opening not only the sides of the loading compartment 15 but a portion of the top as well to provide the operators with very convenient access to the interior of this compartment. Two spring actuated locks 27 and 28 are mounted on the door panel 25 to engage appropriate openings formed in the front plate 21 and in a bar 29 mounted on the rear of the storage compartment 16. The locks 27 and 28 serve to retain the door panel 25 along with the top door plate 23 as well as a door plate 42 in the closed position. The lower edge of the door panel 25 abuts the top edge of the door panel 42 which is hingedly connected to a fixed panel 43 by a hinge 44. The panel 42 can therefore be pivoted downwardly against the fixed panel 43. The fixed panel 43 extends upwardly from a floor 39 of the loading comparement 15 to retain the refuse that is dumped therein.

An identical door assembly is provided on the opposite side of the loading compartment 15. As shown in FIGURE 3, a fixed panel 30 extends upwardly from the floor 39 and a pivotable door panel 65 is connected to the fixed panel 30 by a hinge 66. With this arrangement the door panel 65 can be swung downwardly against the fixed panel 30 to gain access to the loading compartment 15. The top edge of the door panel 65 abuts an upper side door panel 67 and the latter is pivotably connected to the top door plate 24 by a hinge 31. Accordingly the upper side door panel 67 and the top door plate 24 can be pivoted upwardly to overlie each other with both resting on the top plate 22. As a result, excellent access is provided to the loading compartment 15 from either side of the truck.

A set of stairs 40 is secured to the chassis 10 and suspended therefrom adjacent to the loading compartment 15. The stairs 40 are provided for the convenience of the operators when they desire to reach the interior of the loading compartment.

As previously mentioned, the refuse that has been dumped into the loading compartment 15 is moved into the storage compartment 16 by a compacting mechanism generally identified by the reference numeral 20 and illustrated in FIGS. 3 and 4. The compacting mechanism 20 comprises a compression plate 35 that extends through the height and width of the loading compartment 15 and is well reinforced by suitable ribbing 36. A pair of plates 37 and 38 are secured to the bottom edge of the compression plate 35 and extend rearwardly from the compression plate to overlie the floor 39 of the loading compartment 15.

The compression plate 35 is movable between the forward position shown by the solid lines in FIGS. 3 and 4 and a rearward position represented by the broken lines. The plate 35 is retained in its forward position while the refuse is being loaded into the loading compartment 15. The plate 35 is then actuated to move it rearwardly within the loading compartment 15 for transferring the refuse from the loading compartment into the storage compartment 16. As the loading compartment 16 fills with refuse, the compression plate 35 serves to compact the refuse within the loading compartment 16. The plates 37 and 38 move along the floor 39 to transfer even the small bits of refuse that may drop to the bottom of the loading compartment.

The power for actuating the compression plate 35 in its rectilinear movement within the loading compartment 15 is obtained from a piston and cylinder mechanism 45 that is mounted on the floor 39 and secured thereto by brackets 46 and 47. The piston and cylinder mechanism 45 includes a fixed cylinder 48 with a movable piston 49 within the cylinder. The forward end of the cylinder 48 is rigidly connected to the front plate 21 to cooperate with the brackets 46 and 47 for firmly securing it in a fixed position. A piston rod 50 is connected to the piston 49 and extends outwardly from the rear end of the cylinder 48. The extending end of the piston rod 50 is provided with a transverse hole for receiving a pin 51 that extends outwardly from both sides of the piston rod 51 into suitable holes provided in the side plates of a slidable housing 55. The ends of the pin 51 are secured in piston to the side plates of the housing 55 for attaching the piston rod 51 to the rear end of the housing 55 so that the latter moves together with the piston rod 50. The forward end of the housing 55 is secured to the compression plate 35. The housing 55 extends through the length of the piston and cylinder mechanism 45 and its rear end is closed by an end plate 56. As a result, when the compression plate 35 is in its forward position, the housing 55 completely encloses the piston and cylinder mechanism 45 to thoroughly protect it from the refuse that is thrown into the loading compartment 15.

The flow of hydraulic pressure to the cylinder 48 is regulated by manually shifting a handle 52 for regulating a valve 53. When the handle 52 is moved to direct hydraulic pressure to the right end of the cylinder 48 as viewed in FIGURE 4 the piston 49 will be actuated leftwardly to extend the piston rod 50 outwardly of the cylinder for actuating the compression plate 35 in its movement toward the rear of the loading compartment 15. Such movement of the piston rod 50 causes the entire housing 55 to move rearwardly with it and the compression plate 35 moves in unison with the housing 55 by virtue of its connection to the forward end of the housing. As the compression plate 35 and its associated housing 55 move rearwardly into the loading compartment 16, the cylinder 48 becomes exposed within the loading compartment 15 but the refuse has been moved out of the loading compartment 15 by the rearward movement of the door 35 so that the cylinder 48 is not subject to damage at this time. When the compression plate 35 is returned to its forward position the housing 55 moves with it to again cover the entire piston and cylinder mechanism 45 to protect it from the refuse that will be thrown into the loading compartment. It is therefore apparent that the slidable housing 55 performs the two functions of transmitting power from the piston and cylinder mechanism 45 for actuating the compression plate 35 in its reciprocal movement as well as protecting the piston and cylinder mechanism from damage within the interior of the body 12.

The forward end of the storage compartment 16 is defined by the front wall 32 that joins the top of the loading compartment 15. The area beneath the front wall 32 is open for providing communication between the storage compartment 16 and the loading compartment 15 so that full access is had for the compression plate 35 to move the refuse from the loading compartment 15 into the storage compartment 16. When the compression plate 35 is in its forward position the rear end of the housing 55 is in substantial alignment with the rear end of the loading compartment 15. It is therefore apparent, that as the compression plate 35 is moved rearwardly to transfer refuse into the loading compartment, the housing 55 will move into the storage compartment where the refuse is stored. In order to provide free access for the slidable housing 55 to move into the storage compartment, a fixed housing 60 is welded or otherwise secured to a floor 61 of the loading compartment 16. The housing 60 is in axial alignment with the housing 55 and corresponds substantially in length to the length of the housing 55. However, the housing 60 is of greater cross-section to enable the housing 55 to slide freely into the housing 60 in telescoping arrangement. The fixed housing 60 is completely enclosed except for its forward end which receives the housing 55. As a result, the housing 60 prevents the refuse from falling into the path of travel of the housing 55 to avoid any possible interference with the movement of the housing 55 with its associated compression plate 35.

A plate 62 is mounted on the front plate 32 to extend interiorly into the storage compartment 16 and saw teeth 63 are formed on the extending end of the plate 62 for engaging the refuse to prevent it from expanding forwardly into the loading compartment 15 when it is released by the forward movement of the compression plate 35. As best illustrated in FIG. 4, similar saw teeth 64 are mounted on both side panels of the loading compartment 16 in substantial alignment with the saw teeth 63. These saw teeth 63 and 64 serve as retainers on the top and both sides of the forward end of the loading compartment 16 for retaining the refuse therein.

It has been the normal practice in constructing side loading refuse trucks to mount the power actuator for the compacting mechanism beneath the floor of the loading and storage compartments. As a result, in order to provide adequate clearance for the power actuator it was necessary to raise the floor. This increases the height to which the operator must raise the refuse to render it more difficult for the operators to dump the refuse that they collect into the loading compartment. Such mounting of the power actuator underneath the floor of the loading and storage compartments has been adhered to for the purpose of avoiding the expensive structure that was believed to be necessary for protecting the power actuator from the refuse carried by the truck. The applicants here have devised a very simple and inexpensive, but extremely effective protective structure for the power actuator of the compacting mechanism 20 to render it practical to mount the power actuator on the top of the floor rather than beneath it. As a result, the floors 39 and 61 of the loading and storage compartments respectively are lowered beneath the top of the wheels 9 of the chassis with suitable wells being provided within the storage compartment 16 to accommodate the tops of the wheels 9. Such lowering of the floor, appreciably reduces the energy required by the operators in lifting the containers of refuse and dumping the refuse into the loading compartment 15.

From the foregoing detailed description of the present invention, it will readily be understood that an improved side loading refuse truck has been provided incorporating a simple and effective compacting mechanism having its power actuator mounted on top of the floor of the loading and storage compartments to enable the floor of these compartments to be lowered for facilitating the loading of the refuse into the truck by the operator. Moreover, an improved protective structure has been provided for protecting the power actuator of the compacting mechanism from the refuse placed in the truck.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of the invention having now been fully explained in connection with the foregoing description of embodying structure, we hereby claim as our invention:

1. In a motor truck for hauling refuse; a chassis; a loading compartment on said chassis for receiving the refuse to be hauled; a storage compartment on said chassis and in communication with said loading compartment; transfer means mounted in said loading compartment and actuatable for transferring the refuse from said loading compartment into said storage compartment; a power actuator mounted in said loading compartment; a movable housing mounted to overlie said power actuator for protecting it from the refuse in the truck; said movable housing being connected to said power actuator and to said transfer means for transmitting the power from said actuator to said transfer means for actuating the latter in its transfer operation; a fixed plate covering a portion of the top of said loading compartment; a top door plate covering the remaining portion of the top of said loading compartment and being hingedly connected to said fixed top plate to enable it to be pivoted into everlying relationship with said fixed top plate to expose a portion of the top of said loading compartment; and a side door plate hingedly connected to said top door plate to normally depend therefrom for enclosing the side of said loading compartment but pivotable upwardly therefrom relative to said top door plate into overlying relationship with said top door plate for exposing the side of said loading compartment.

2. In a motor truck for hauling refuse; a chassis; a loading compartment mounted on said chassis; a storage compartment mounted on said chassis adjacent to said loading compartment and having communication with said loading compartment; a fixed top plate covering a portion of the top of said loading compartment; a top door plate covering the remaining portion of the top of said loading compartment and being hingedly connected to said fixed top plate to enable it to be pivoted into overlying relationship with said fixed top plate to expose a portion of the top of said loading compartment; a side door plate hingedly connected to said top door plate to normally depend therefrom for enclosing the side of said loading compartment but pivotable upwardly therefrom relative to said top door plate into overlying relationship with said top door plate for exposing the side of said loading compartment; and locking means actuatable to lock said door plates in their closed positions for completely enclosing said loading compartment.

References Cited by the Examiner

UNITED STATES PATENTS

| | | | |
|---|---|---|---|
| 2,750,055 | 6/1956 | Huffines | 214—83.3 X |
| 2,863,580 | 12/1958 | Kamin | 214—504 |
| 2,865,529 | 12/1958 | Sprouse | 220—34 |
| 2,996,203 | 8/1961 | Rosaia | 214—82 |
| 2,999,606 | 9/1961 | Kamin | 214—83 |
| 3,170,578 | 2/1965 | Moreland | 214—82 |
| 3,207,336 | 9/1965 | Boeck et al. | 214—82 |

GERALD M. FORLENZA, *Primary Examiner.*

ALBERT J. MAKAY, *Examiner.*